(12) United States Patent (10) Patent No.: US 12,632,189 B2
Uchida (45) Date of Patent: May 19, 2026

(54) MEMORY SYSTEM AND INFORMATION PROCESSING SYSTEM

(71) Applicant: Kioxia Corporation, Tokyo (JP)

(72) Inventor: Daisuke Uchida, Fujisawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/766,990

(22) Filed: Jul. 9, 2024

(65) Prior Publication Data

US 2025/0077099 A1      Mar. 6, 2025

(30) Foreign Application Priority Data

Aug. 30, 2023    (JP) ................................. 2023-140410

(51) Int. Cl.
*G06F 3/06* (2006.01)
(52) U.S. Cl.
CPC .......... *G06F 3/0634* (2013.01); *G06F 3/0604* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 8,205,028 B1 | 6/2012 | Sakarda | |
| 11,275,620 B2 | 3/2022 | Boenapalli et al. | |
| 2014/0365713 A1* | 12/2014 | Chien ................... | G06F 3/0676 711/103 |

| | | | | |
|---|---|---|---|---|
| 2015/0032913 A1* | 1/2015 | Kim | ................... | G06F 13/4291 710/24 |
| 2018/0018090 A1* | 1/2018 | Lu | ........................... | G06F 3/0679 |
| 2019/0227751 A1* | 7/2019 | Khakifirooz | ........ | G11C 11/5628 |
| 2020/0073795 A1* | 3/2020 | Asano | ................... | G06F 3/0656 |
| 2021/0034536 A1 | 2/2021 | Kim et al. | | |
| 2021/0294654 A1 | 9/2021 | Boenapalli et al. | | |
| 2022/0114117 A1* | 4/2022 | Lee | ........................ | G06F 3/0688 |
| 2022/0374172 A1* | 11/2022 | Kim | .......................... | G06F 3/0673 |
| 2023/0072721 A1 | 3/2023 | Park et al. | | |
| 2024/0020035 A1* | 1/2024 | Yi | .......................... | G06F 3/0653 |
| 2024/0071508 A1* | 2/2024 | Yang | ................. | G11C 16/3459 |
| 2025/0013595 A1* | 1/2025 | Kuo | ..................... | G06F 13/4234 |

FOREIGN PATENT DOCUMENTS

CN            104239245 A      12/2014

* cited by examiner

*Primary Examiner* — Mohamed M Gebril
*Assistant Examiner* — Elias Young Kim
(74) *Attorney, Agent, or Firm* — Oblon, McClelland, Maier & Neustadt, L.L.P.

(57)            ABSTRACT

In general, according to one embodiment, a memory system includes: a nonvolatile memory including a plurality of memory cells; and a memory controller having a first state in which write data transferred from an external host is written in the nonvolatile memory at a rate of a first number of bits per memory cell, and a second state in which the write data is written at a rate of a second number of bits per memory cell. The second number of bits differs from the first number of bits. The memory controller is configured to transmit information relating to a transfer rate of the write data to the host in response to a first request from the host. The information includes: first information associated with the first state; and second information associated with the second state.

14 Claims, 7 Drawing Sheets

16

| ID | State of memory system | Rx transfer rate | | Tx transfer rate | |
|---|---|---|---|---|---|
| | | Frequency | Number of lanes | Frequency | Number of lanes |
| A | Fast mode | f_r1 | n_r1 | f_t1 | n_t1 |
| B | Normal mode | f_r2 | n_r2 | f_t2 | n_t2 |

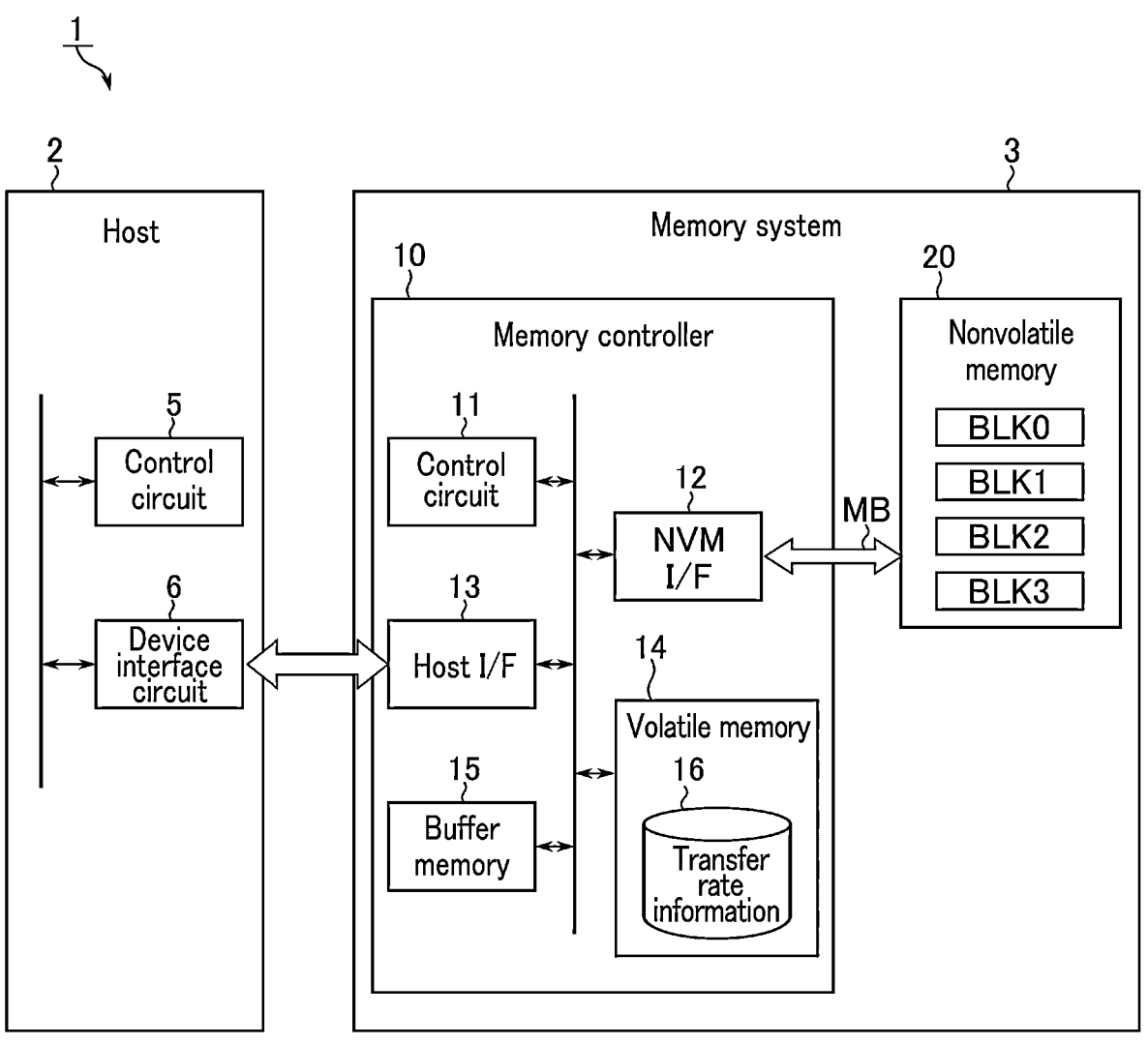
F I G. 1

| ID | State of memory system | Rx transfer rate | | Tx transfer rate | |
|---|---|---|---|---|---|
| | | Frequency | Number of lanes | Frequency | Number of lanes |
| A | Fast mode | f_r1 | n_r1 | f_t1 | n_t1 |
| B | Normal mode | f_r2 | n_r2 | f_t2 | n_t2 |

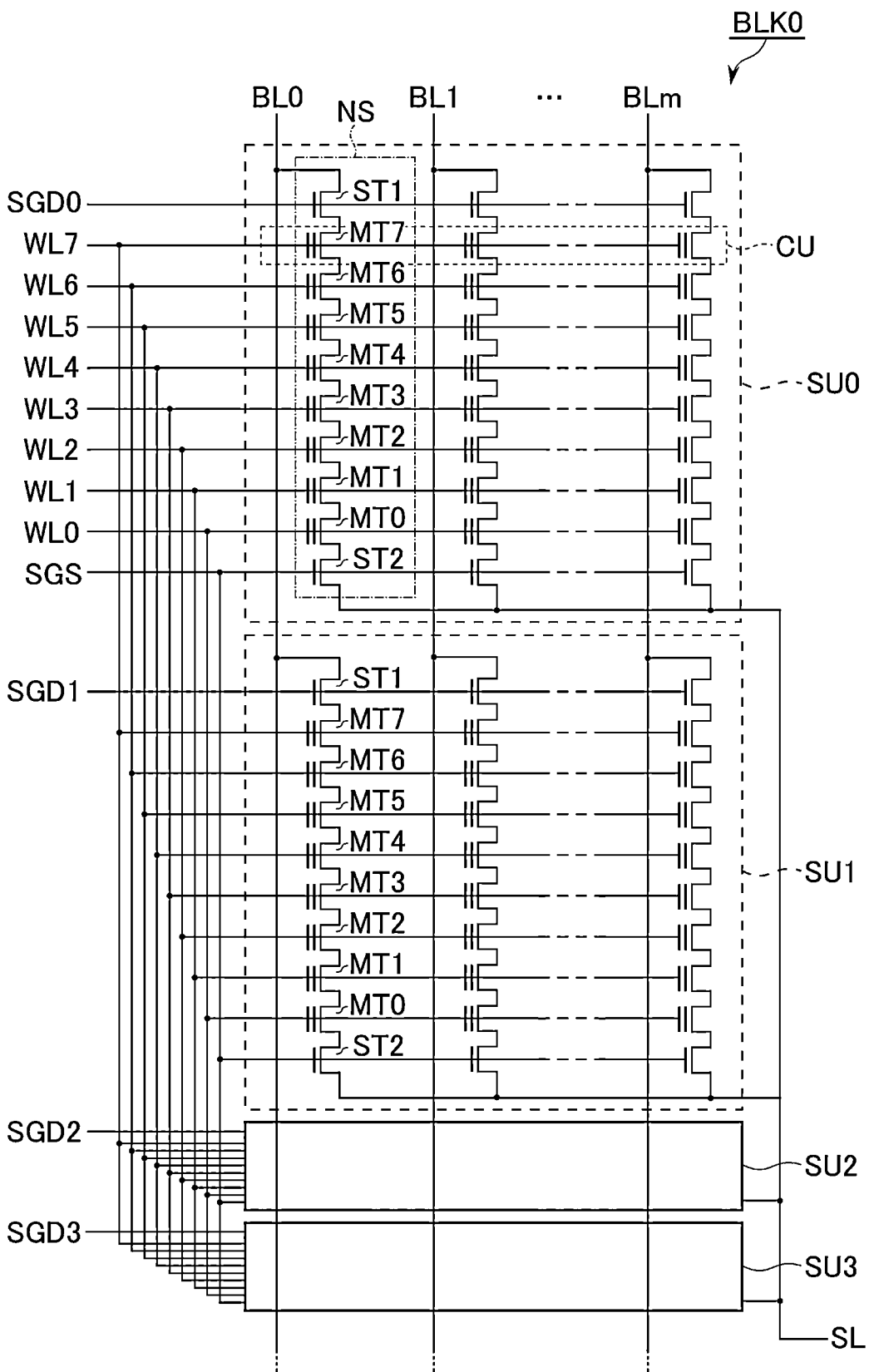
F I G. 4

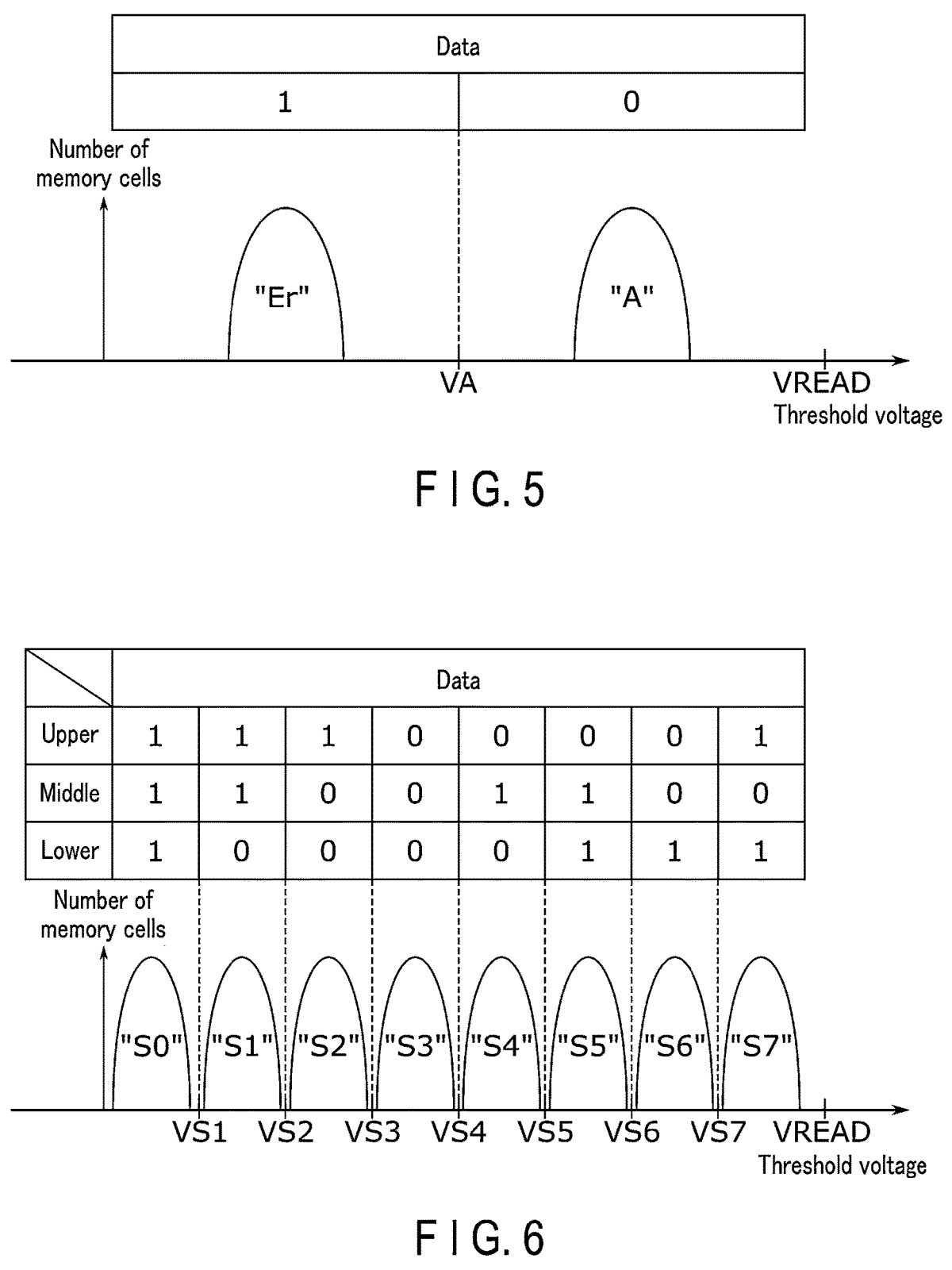

| Data | |
|:---:|:---:|
| 1 | 0 |

Number of memory cells

"Er"    "A"

VA    VREAD

Threshold voltage

FIG. 5

| | Data | | | | | | | |
|---|:---:|:---:|:---:|:---:|:---:|:---:|:---:|:---:|
| Upper | 1 | 1 | 1 | 0 | 0 | 0 | 0 | 1 |
| Middle | 1 | 1 | 0 | 0 | 1 | 1 | 0 | 0 |
| Lower | 1 | 0 | 0 | 0 | 0 | 1 | 1 | 1 |

Number of memory cells

"S0" "S1" "S2" "S3" "S4" "S5" "S6" "S7"

VS1 VS2 VS3 VS4 VS5 VS6 VS7 VREAD

Threshold voltage

FIG. 6

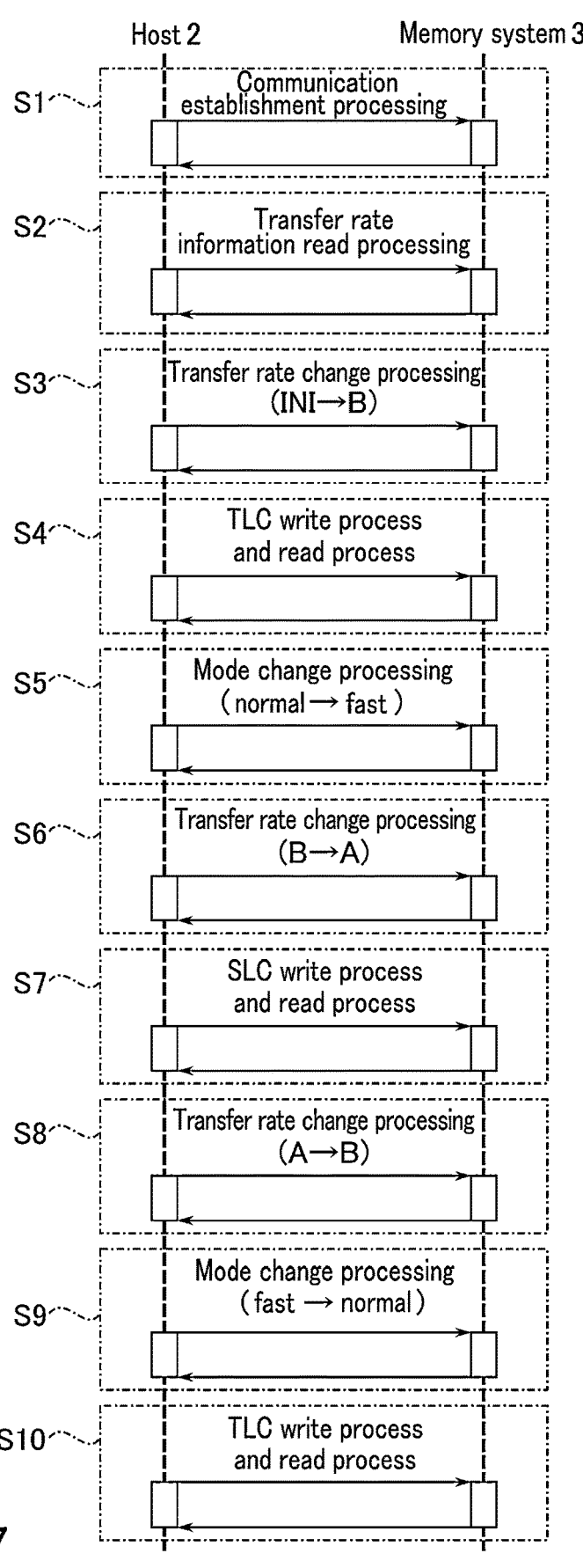

Host 2                    Memory system 3

S1  Communication establishment processing

S2  Transfer rate information read processing

S3  Transfer rate change processing (INI→B)

S4  TLC write process and read process

S5  Mode change processing (normal→fast)

S6  Transfer rate change processing (B→A)

S7  SLC write process and read process

S8  Transfer rate change processing (A→B)

S9  Mode change processing (fast→normal)

S10  TLC write process and read process

F I G. 7

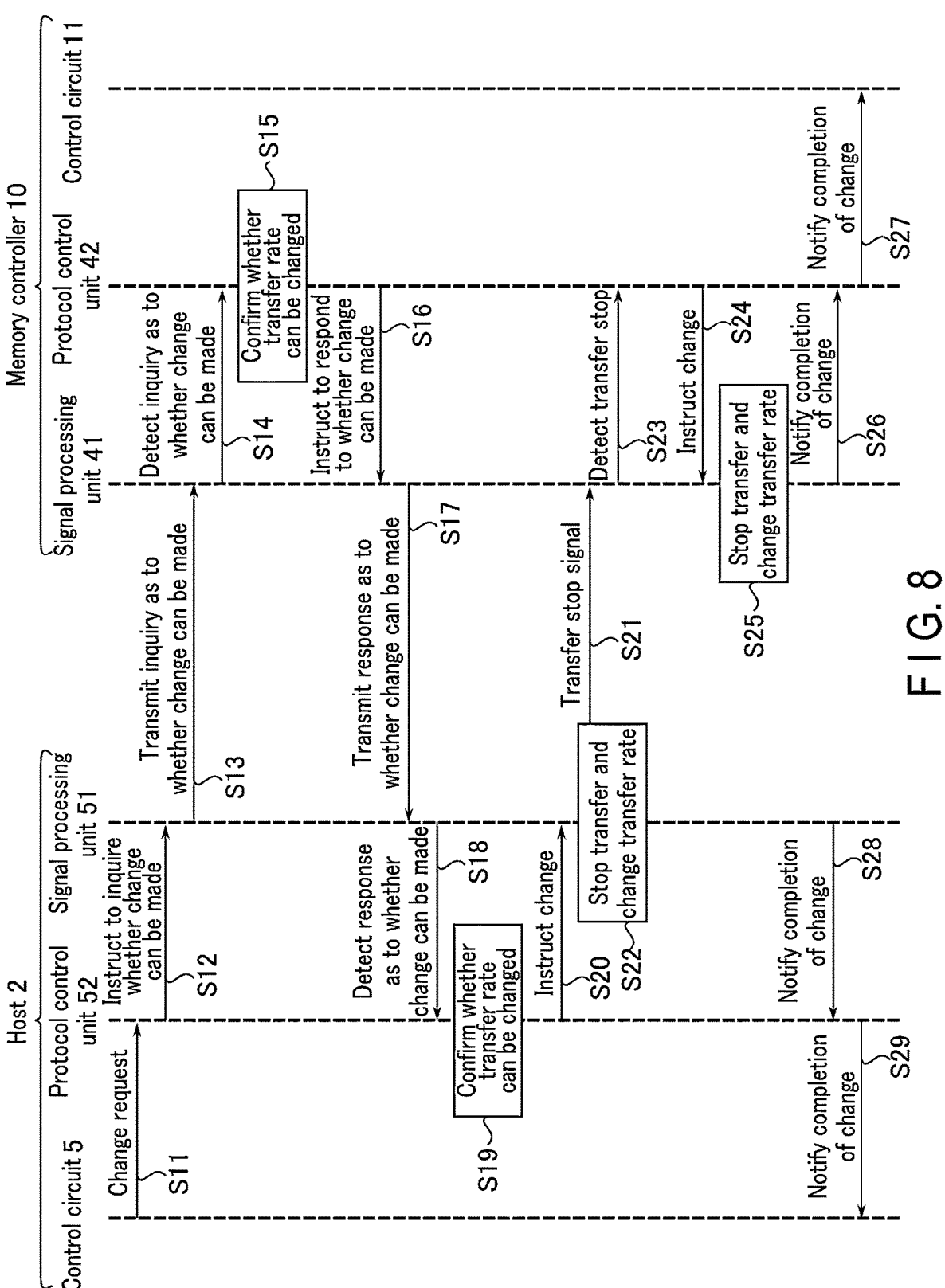
F I G. 8

16A

| ID | State of memory system | Write process | Rx transfer rate | | Tx transfer rate | |
|---|---|---|---|---|---|---|
| | | | Frequency | Number of lanes | Frequency | Number of lanes |
| A | Fast mode | SLC | f_r1 | n_r1 | f_t1 | n_t1 |
| B | Normal mode | TLC | f_r2_1 | n_r2_1 | f_t2 | n_t2 |
| C | | QLC | f_r2_2 | n_r2_2 | | |

F I G. 9

MEMORY SYSTEM AND INFORMATION PROCESSING SYSTEM

CROSS-REFERENCE TO RELATED APPLICATIONS

This application is based upon and claims the benefit of priority from Japanese Patent Application No. 2023-140410, filed Aug. 30, 2023, the entire contents of which are incorporated herein by reference.

FIELD

Embodiments described herein relate generally to a memory system and an information processing system.

BACKGROUND

An information processing system including a host and a memory system connected to the host is known. The memory system includes a NAND flash memory as a nonvolatile memory and a memory controller that controls the nonvolatile memory.

BRIEF DESCRIPTION OF THE DRAWINGS

FIG. 1 is a block diagram showing an example configuration of an information processing system according to an embodiment.

FIG. 4 is a circuit diagram showing an example configuration of a nonvolatile memory according to the embodiment.

FIG. 5 is a diagram showing a first example of a distribution of threshold voltages of memory cell transistors according to the embodiment.

FIG. 6 is a diagram showing a second example of a distribution of threshold voltages of memory cell transistors according to the embodiment.

FIG. 7 is a sequence diagram showing an example of a series of processing including transfer rate change processing in the information processing system according to the embodiment.

FIG. 8 is a sequence diagram showing an example of the transfer rate change processing in the information processing system according to the embodiment.

FIG. 9 is a diagram showing an example of a data structure of transfer rate information stored in a memory system according to a modification.

DETAILED DESCRIPTION

Figures 2, 3:
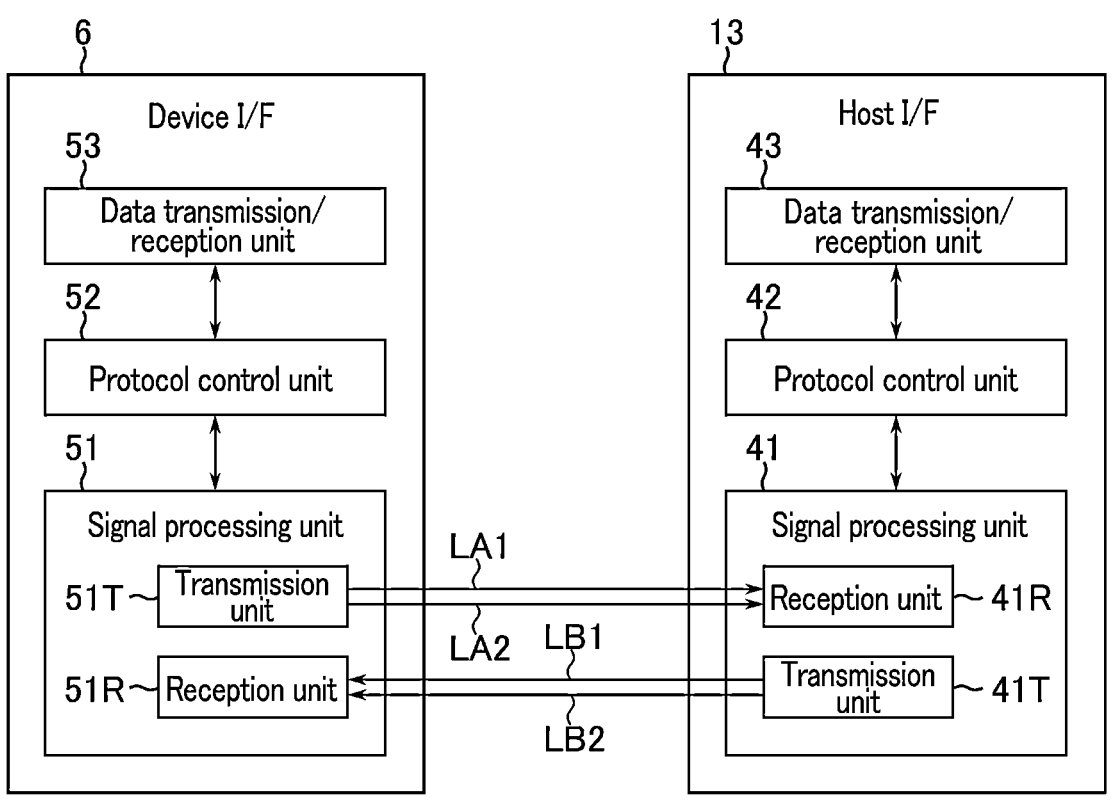
FIG. 2 is a block diagram showing an example configuration of a connection between a host and a memory controller according to the embodiment.
FIG. 3 is a diagram showing an example of a data structure of transfer rate information stored in a memory system according to the embodiment.

In general, according to one embodiment, a memory system includes: a nonvolatile memory including a plurality of memory cells; and a memory controller having a first state in which write data transferred from an external host is written in the nonvolatile memory at a rate of a first number of bits per memory cell, and a second state in which the write data is written at a rate of a second number of bits per memory cell. The second number of bits differs from the first number of bits. The memory controller is configured to transmit information relating to a transfer rate of the write data to the host in response to a first request from the host. The information includes: first information associated with the first state; and second information associated with the second state.

Hereinafter, embodiments will be described with reference to the drawings. Note that, in the following description, components having the same function and configuration are denoted by common reference numerals. In addition, in a case where a plurality of components having a common reference numeral are distinguished, suffixes are added to the common reference numeral to distinguish among them. Note that in cases where the plurality of components do not need to be particularly distinguished, only the common reference numeral is attached to the plurality of components, and no suffixes are attached thereto.

1. Embodiment

1.1 Configuration 1.1.1 Information Processing System

A configuration of an information processing system according to an embodiment will be described.

FIG. 1 is a block diagram showing an example configuration of an information processing system according to an embodiment. As shown in FIG. 1, an information processing system 1 includes a host 2 and a memory system 3.

The host 2 is a data processing device that processes data using the memory system 3. The host 2 is for example a mobile system-on-a-chip (SoC) implemented in a smart phone.

The memory system 3 is a storage device, such as a memory system adhered to universal flash storage (UFS) standard. The memory system 3 executes a write process, a read process, and an erase process for data in response to respective requests from the host 2. For example, the memory system 3 supports a write booster function adhered to the UFS 3.1 standard and the UFS 4.0 standard.

The memory system 3 in which the write booster function is enabled can improve write performance by writing data at a higher speed than writing data in the memory system 3 in which the write booster function is disabled. Hereinafter, a state of the memory system 3 in which the write booster function is enabled may be called a "fast mode". A state of the memory system 3 in which the write booster function is disabled may be called a "normal mode".

1.1.2 Memory System

Next, with continued reference to FIG. 1, an internal configuration of the memory system 3 will be described. The memory system 3 includes a memory controller 10 and a nonvolatile memory 20.

The memory controller 10 is configured by an integrated circuit such as a system-on-a-chip (SoC), for example. The memory controller 10 controls the nonvolatile memory 20 on the basis of a request from the host 2.

Specifically, for example, the memory controller 10 writes write data in the nonvolatile memory 20 on the basis of a write request from the host 2. In addition, the memory controller 10 reads read data from the nonvolatile memory 20 on the basis of a read request from the host 2. The memory controller 10 subsequently transmits the read data to the host 2.

The nonvolatile memory 20 is a NAND flash memory, for example. The nonvolatile memory 20 includes a plurality of blocks BLK (BLK0 to BLK3). Each block BLK includes a plurality of memory cells. Each memory cell stores data. A block BLK is a unit of data erasure for example.

1.1.3. Memory Controller

Next, with continued reference to FIG. 1, an internal configuration of the memory controller 10 will be described. The memory controller 10 includes a control circuit 11, a nonvolatile memory interface circuit (NVM I/F) 12, a host interface circuit (host I/F) 13, a volatile memory 14, and a buffer memory 15. The functions of the control circuit 11, the nonvolatile memory interface circuit 12, the host interface circuit 13, the volatile memory 14, and the buffer memory 15, which are described hereinafter, can be realized by dedicated hardware, a processor that executes a program, or a combination thereof.

The control circuit 11 is a circuit that controls the entire memory controller 10. The control circuit 11 includes, for example, a processor, such as a central processing unit (CPU), a read only memory (ROM), and a random access memory (RAM).

The nonvolatile memory interface circuit 12 governs communication between the memory controller 10 and the nonvolatile memory 20. The nonvolatile memory interface circuit 12 is coupled to the nonvolatile memory 20 via a memory bus MB. The memory bus MB is compatible with, for example, a single data rate (SDR) interface, a toggle double data rate (DDR) interface, or an open NAND flash interface (ONFI).

The host interface circuit 13 governs communication between the memory controller 10 and the host 2. The host interface circuit 13 is coupled to the host 2 in adherence to M-PHY™, for example.

The volatile memory 14 is, for example, a static random access memory (SRAM). The data stored in the volatile memory 14 is initialized with a value stored in the nonvolatile memory 20 when the memory system 3 is activated. Information relating to a transfer rate of data between the host 2 and the memory system 3 and the like is stored in the volatile memory 14. Specifically, for example, the transfer rate information 16 is stored in the volatile memory 14. The volatile memory 14 may be a dynamic random access memory (DRAM). In a case where the volatile memory 14 is configured by a DRAM, the volatile memory 14 is coupled to the memory controller 10 via a bus adhered to the DRAM interface standard.

For the transfer rate information 16, an optimal transfer rate according to the state of the memory system 3 is stored as capability information. The transfer rate information 16 may be stored in the nonvolatile memory 20. The details of the transfer rate information 16 are described later.

The buffer memory 15 is an SRAM, for example. The buffer memory 15 buffers data between the host 2 and the nonvolatile memory 20. Specifically, the buffer memory 15 temporarily stores write data and read data.

1.1.4 Host

Next, with a continuous reference to FIG. 1, an internal configuration of the host 2 will be described. The host 2 includes a control circuit 5 and a device interface circuit (device I/F) 6. The functions of the control circuit 5 and the device interface circuit 6, which are described hereinafter, can be realized by dedicated hardware, a processor that executes a program, or a combination thereof.

The control circuit 5 is a circuit that controls the host 2. The control circuit 5 includes, for example, a processor such as a CPU, a ROM, and a RAM.

The device interface circuit 6 governs communication between the host 2 and the memory system 3. The device interface circuit 6 is coupled to the host interface circuit 13 of the memory controller 10 in adherence to M-PHY™.

1.1.5 Connection Between Host and Memory Controller

FIG. 2 is a block diagram showing an example configuration of a connection between the host and the memory controller according to the embodiment. FIG. 2 shows an example configuration of a connection between the device interface circuit 6 of the host 2 and the host interface circuit 13 of the memory controller 10. The host interface circuit 13 includes a signal processing unit 41, a protocol control unit 42, and a data transmission/reception unit 43. The device interface circuit 6 includes a signal processing unit 51, a protocol control unit 52, and a data transmission/reception unit 53. The device interface circuit 6 of the host 2 and the host interface circuit 13 of the memory controller 10 are coupled by communication paths LA1, LA2, LB1, and LB2. The communication paths LA1, LA2, LB1, and LB2 are physical lanes used for transmitting and receiving data.

First, the configuration of the host interface circuit 13 is explained.

The signal processing unit 41 is a circuit corresponding to a physical layer. The signal processing unit 41 is adhered to M-PHY™, for example. The signal processing unit 41 includes a reception unit 41R and a transmission unit 41T.

The reception unit 41R receives signals from the transmission unit 51T via the communication paths LA1 and LA2. The reception unit 41R extracts a packet from a signal received from the transmission unit 51T and transfers it to the protocol control unit 42.

The transmission unit 41T generates a signal based on a packet received from the protocol control unit 42. The transmission unit 41T transmits a generated signal to the reception unit 51R via the communication paths LB1 and LB2.

The protocol control unit 42 is a circuit corresponding to a data link layer, a network layer, and a transport layer. The protocol control unit 42 is adhered to Unipro™, for example. The protocol control unit 42 generates a packet based on data received from the data transmission/reception unit 43, and transfers it to the transmission unit 41T of the signal processing unit 41. The protocol control unit 42 extracts data from a packet received from the reception unit 41R of the signal processing unit 41, and transfers it to the data transmission/reception unit 43. The protocol control unit 42 controls the number of lanes and a frequency used for receiving the signal at the reception unit 41R and the number of lanes and a frequency used for transmitting the signal from the transmission unit 41T.

The data transmission/reception unit 43 functions as an interface between the host interface circuit 13 and each circuit in the memory controller 10. The data transmission/reception unit 43 transfers data transferred from the protocol control unit 42 to each function in the memory controller 10. The data transmission/reception unit 43 transfers the data received from each circuit of the memory controller 10 to the protocol control unit 42.

Next, the configuration of the device interface circuit 6 is explained.

The signal processing unit 51 is a circuit corresponding to a physical layer. The signal processing unit 51 is adhered to M-PHY™, for example. The signal processing unit 51 includes a reception unit 51R and a transmission unit 51T.

The reception unit 51R receives signals from the transmission unit 41T via the communication paths LB1 and LB2. The reception unit 51R extracts a packet from a signal received from the transmission unit 41T and transfers it to the protocol control unit 52.

The transmission unit 51T generates a signal based on a packet received from the protocol control unit 52. The transmission unit 51T transmits a generated signal to the reception unit 41R via the communication paths LA1 and LA2.

The protocol control unit 52 is a circuit corresponding to a data link layer, a network layer, and a transport layer. The protocol control unit 52 is adhered to Unipro™, for example. The protocol control unit 52 generates a packet based on data received from the data transmission/reception unit 53, and transfers it to the transmission unit 51T of the signal processing unit 51. The protocol control unit 52 extracts data from a packet received from the reception unit 51R of the signal processing unit 51, and transfers it to the data transmission/reception unit 53. The protocol control unit 52 controls the number of lanes and a frequency used for receiving a signal at the reception unit 51R and the number of lanes and a frequency used for transmitting a signal from the transmission unit 51T.

The data transmission/reception unit 53 functions as an interface between the device interface circuit 6 and each circuit in the host 2. The data transmission/reception unit 53 transfers data transferred from the protocol control unit 52 to each function in the host 2. The data transmission/reception unit 53 transfers the data received from each circuit of the host 2 to the protocol control unit 52.

1.1.6 Transfer Rate Information

FIG. 3 is a diagram showing an example of a data structure of transfer rate information stored in the memory system according to the embodiment.

As shown in FIG. 3, a parameter A corresponding to a fast mode and a parameter B corresponding to a normal mode are stored in the transfer rate information 16 as parameters for determining a transfer rate. Each of the parameters A and B includes a frequency and the number of lanes corresponding to a transfer rate (Rx transfer rate) at the time of receiving data from the host 2 by the memory system 3, and a frequency and the number of lanes corresponding to a transfer rate (Tx transfer rate) at the time of transmitting data to the host 2 by the memory system 3.

Specifically, the parameter A includes a frequency f_r1 and the number of lanes n_r1 corresponding to an Rx transfer rate in a fast mode, and a frequency f_t1 and the number of lanes n_t1 corresponding to a Tx transfer rate in a fast mode. The parameter B includes a frequency f_r2 and the number of lanes n_r2 corresponding to an Rx transfer rate in a normal mode, and a frequency f_t2 and the number of lanes n_t2 corresponding to a Tx transfer rate in a normal mode.

The Rx transfer rate and the Tx transfer rate in the same mode are independently set. In other words, the frequency f_r1 and the number of lanes n_r1 are set independently from the frequency f_t1 and the number of lanes n_t1. The frequency f_r2 and the number of lanes n_r2 are set independently from the frequency f_t2 and the number of lanes n_t2.

The Tx transfer rate in the fast mode and the Tx transfer rate in the normal mode may be the same or different.

The Rx transfer rate in the fast mode is set to be higher than the Rx transfer rate in the normal mode. In other words, the Rx transfer rate determined by the frequency f_r1 and the number of lanes n_r1 is higher than the Rx transfer rate determined by the frequency f_r2 and the number of lanes n_r2. Specifically, in a case where the numbers of lanes n_r1 and n_r2 are the same, for example, the frequency f_r1 is higher than the frequency f_r2. In a case where the frequency f_r1 and the frequency f_r2 are the same, the number of lanes n_r1 is 2, and the number of lanes n_r2 is 1. A combination of the frequency f_r1 and the frequency f_r2 and a combination of the number of lanes n_r1 and the number of lanes n_r2 are merely examples, and these values may be discretionarily selected within the range where the Rx transfer rate in the fast mode is higher than the Rx transfer rate in the normal mode.

1.1.7 Nonvolatile Memory

Next, a configuration of the nonvolatile memory 20 is described. FIG. 4 is a circuit diagram showing an example configuration of the nonvolatile memory according to the embodiment. FIG. 4 shows a configuration of the block BLK0 as an example. The configuration of the other blocks BLK1 through BLK3 is the same as the configuration of the blocks BLK0 The block BLK0 includes, for example, four string units SU0 to SU3. In FIG. 4, the string units SU2 and SU3 are shown in a simplified manner.

Each string unit SU includes a plurality of NAND strings NS that are respectively associated with bit lines BL0, BL1, . . . , to BLm (m is an integer greater than 2). The NAND strings NS each include, for example, memory cell transistors MT0 to MT7 and select transistors ST1 and ST2.

Each memory cell transistor MT includes a control gate and a charge storage layer, and stores data in a nonvolatile manner. The select transistors ST1 and ST2 are each used for the selection of the applicable string unit SU in various processing.

In each NAND string NS, memory cell transistors MT0 to MT7 are coupled in series. The select transistor ST1 is coupled between one end of the serially coupled memory cell transistors MT0 through MT7 and the bit line BL associated therewith. The other end of the serially-coupled memory cell transistors MT0 through MT7 is coupled to the drain of the select transistor ST2. The select transistor ST2 has its source coupled to a source line SL.

The gates of the select transistors ST1 respectively included in string units SU0 through SU3 in the same block BLK are respectively coupled in common to the select gate lines SGD0 through SGD3. The control gates of the memory cell transistors MT0 through MT7 are respectively coupled in common to the word lines WL0 through WL7. The multiple select transistors ST2 have their gates coupled in common to a select gate line SGS.

The bit lines BL0 through BLm are shared by the blocks BLK0 through BLK3. The same bit line BL is coupled to the NAND strings NS corresponding to the same column address. The word lines WL0 to WL7 as a group are provided for blocks BLK0 through BLK3, respectively. The source line SL is shared among a plurality of blocks BLK0 through BLK3, for example.

A set including multiple memory cell transistors MT coupled to the common word line WL within one string unit SU may be called a "cell unit CU" for example, and may be used in a unit of data write. In one example, the storage capacity of the cell unit CU, constituted by the memory cell transistors MT each adapted to store 1-bit data, is defined as "1-page data". In other words, 1-page data is a data area of a 1-bit data column having the number of columns according to the number of memory cell transistors MT in the cell unit CU. 1-page data is used as a unit of data reading, for example. The cell unit CU can have a storage capacity of two pages of data or more in accordance with the number of bits of data stored in the memory cell transistor MT.

The circuit configuration of the blocks BLK explained in the above is merely an example and is not limited to this example. For example, the number of bit lines BL is not limited to three or more, and it may be one or two. The number of blocks BLK included in the nonvolatile memory 20 may be designed to be a discretionarily selected number.

The number of string units SU included in each block BLK may be determined as appropriate. The numbers of the memory cell transistors MT and the select transistors ST1 and ST2 in each NAND string NS may be discretionarily set as well.

1.1.8 Threshold Voltage Distribution

The plurality of memory cell transistors MT have different threshold voltage distributions in accordance with the number of bits of data stored therein. FIG. 5 is a schematic diagram showing a first example of a distribution of threshold voltages of memory cell transistors MT according to the embodiment. FIG. 6 is a schematic diagram showing a second example of a distribution of threshold voltages of memory cell transistors MT according to the embodiment. The first example corresponds to a case where each of the memory cell transistors MT stores 1-bit data. The second example corresponds to a case where each of the memory cell transistors MT stores 3-bit data.

First, the first example is described with reference to FIG. 5.

In the case where 1-bit data is stored in the memory cell transistors MT, the threshold voltage distribution can be divided into two. The two threshold voltage distributions will be called an "Er" state and an "A" state, in ascending order of threshold voltage.

The "Er" state in the above-described threshold voltage distribution corresponds to an erase state of the memory cell transistors MT. The threshold voltages in the "Er" state are lower than a voltage VA. The threshold voltage in the "A" state is equal to or greater than the voltage VA and lower than a voltage VREAD. The voltage VREAD is a voltage applied to non-selected word lines at the time of a read process. When the voltage VREAD is applied to a gate, a memory cell transistor MT is turned on, regardless of data stored therein. The relationship between these voltages is VA<VREAD.

The foregoing two threshold voltage distributions correspond to respective 1-bit data sets. In other words, the memory cell transistors MT included in the "Er" state store "1" data. The memory cell transistors MT included in the "A" state store "0" data.

Such threshold voltage distributions that are formed when 1-bit data is stored in the memory cell transistors MT are realized by single-level cell (SLC) write processing.

Next, the second example is described with reference to FIG. 6.

In the case where 3-bit data is stored in the memory cell transistors MT, the threshold voltage distribution can be divided into eight. These eight threshold voltage distributions are respectively called an "S0" state, an "S1" state, an "S2" sate, an "S3" state, an "S4" state, an "S5" state, an "S6" state, and an "S7" state, from the lower threshold voltage to the higher threshold voltage.

The "S0" state in the above-described threshold voltage distribution corresponds to the erase state of the memory cell transistors MT. The threshold voltages in the "S0" state are lower than a voltage VS1. The threshold voltages in the "S1" state are equal to or greater than the voltage VS1 and lower than a voltage VS2. The threshold voltages in the "S2" state are equal to or greater than the voltage VS2 and lower than a voltage VS3. The threshold voltages in the "S3" state are equal to or greater than the voltage VS3 and lower than a voltage VS4. The threshold voltages in the "S4" state are equal to or greater than the voltage VS4 and lower than a voltage VS5. The threshold voltages in the "S5" state are equal to or greater than the voltage VS5 and lower than a voltage VS6. The threshold voltages in the "S6" state are equal to or greater than the voltage VS6 and lower than a voltage VS7. The threshold voltages in the "S7" state are equal to or greater than the voltage VS7 and lower than the voltage VREAD. The relationship between these voltages is VS1<VS2<VS3<VS4<VS5<VS6<VS7<VREAD.

The foregoing eight threshold voltage distributions correspond to respective 3-bit data sets. In other words, the memory cell transistors MT included in the "S0" state store "111" data. The memory cell transistors MT included in the "S1" state store "110" data. The memory cell transistors MT included in the "S2" state store "100" data. The memory cell transistors MT included in the "S3" state store "000" data. The memory cell transistors MT included in the "S4" state store "010" data. The memory cell transistors MT included in the "S5" state store "011" data. The memory cell transistors MT included in the "S6" state store "001" data. The memory cell transistors MT included in the "S7" state store "101" data.

Such threshold voltage distributions that are formed when 3-bit data is stored in the memory cell transistors MT are realized by triple level cell (TLC) write processing.

1.2 Operation

Next, an operation in the information processing system according to the embodiment will be described.

1.2.1 Write Process

With a TLC write process, it is possible to have the same number of memory cell transistors MT store three times the data as that written in an SLC write process. As shown in FIGS. 5 and 6, on the other hand, the threshold voltage distribution formed in an SLC write process is a simpler distribution than that formed in a TLC write process. For this reason, when data of the same size is written in the nonvolatile memory 20, a time required for an SLC write process (tProg(SLC)) is shorter than a time required for a TLC write process (tProg(TLC)).

In the memory system 3 of the fast mode, an SLC write process, for example, is selected from the viewpoint of a write speed. In the memory system 3 of the normal mode, a TLC write process, for example, is selected from the viewpoint of a memory capacity. Thus, when the same data is written, the memory system 3 in the fast mode can send a write completion notification to the host 2 earlier than the memory system 3 in the normal mode can.

After being read from the nonvolatile memory 20, the data written in an SLC write process in the fast mode is written back to the nonvolatile memory 20 through a write process with a higher degree of integration (e.g., a TLC write process) than an SLC write process through, for example, a background processing at a time range during which the host 2 does not issue a request. The background processing is a processing that is voluntarily performed by the memory controller 10, independent of a request from the host 2. It is thereby possible to avoid a memory capacity reduction in the nonvolatile memory 20 as a result of an SLC write process in a fast mode.

1.2.2 Series of Processing Including Transfer Rate Change Processing

FIG. 7 is a sequence diagram showing an example of a series of processing including transfer rate change processing in the information processing system according to the embodiment.

First, the host 2 and the memory system 3 perform a communication establishment process and establish communication through a communication path (S1). The signal processing units 41 and 51 are thus initialized. In this case, the data transfer rate between the host 2 and the memory system 3 is set to an initial value. In other words, the parameter corresponding to the transfer rate is set to an initial parameter INI. The initial parameter INI may be the same parameter as the parameter A or B or differ from the parameters A and B. Immediately after communication between the memory system 3 and the host 2 is established, the state of the memory system 3 is a normal mode.

Subsequently, the host 2 and the memory system 3 perform transfer rate information read processing (S2). Specifically, the host 2 issues a transfer rate information read request and transmits the request to the memory system 3. The memory system 3 transmits transfer rate information 16 to the host 2 in response to the transfer rate information read request.

The host 2 determines the transfer rate in accordance with the state of the memory system 3 based on the transfer rate information 16 received in the processing in S2. Specifically, the state of the memory system 3 is in a normal mode, and the host 2 selects the parameter B corresponding to the normal mode from the transfer rate information 16. Then, the host 2 and the memory system 3 performs the transfer rate change processing (S3). Thus, the parameter corresponding to the rate of the data transfer between the host 2 and the memory system 3 is changed from the initial parameter INI to the parameter B.

The host 2 and the memory system 3 perform a write process and a read process based on the transfer rate changed in the processing in S3 (S4).

Specifically, the host 2 issues a write request and transmits the request to the memory system 3 with the write data. The write data is transferred from the host 2 to the memory system 3 at the frequency f_r2 and in the number of lanes n_r2 corresponding to the Rx transfer rate in the normal mode. The memory system 3 performs a TLC write process corresponding to the normal mode in response to the write request, and writes data in the nonvolatile memory 20.

The host 2 issues a read request and transmits it to the memory system 3. The memory system 3 reads data from the nonvolatile memory 20 in response to a read request. The memory system 3 transmits the read data to the host 2. The read data is transferred from the memory system 3 to the host 2 at the frequency f_t2 and in the number of lanes n_t2 corresponding to the Tx transfer rate in the normal mode.

Next, the host 2 determines that data is written at a higher speed. Along with this, the host 2 and the memory system 3 perform the mode change processing (S5). The state of the memory system 3 is thereby changed from the normal mode to the fast mode.

The host 2 determines the transfer rate in accordance with the state of the memory system 3 based on the transfer rate information 16 received in the processing in S2. Specifically, since the state of the memory system 3 was changed to the fast mode in the processing in S5, the host 2 selects the parameter A corresponding to the fast mode from the transfer rate information 16. Then, the host 2 and the memory system 3 perform the transfer rate change processing (S6). Thus, the parameter corresponding to the rate of the data transfer between the host 2 and the memory system 3 is changed from the parameter B to the parameter A.

The host 2 and the memory system 3 perform a write process and a read process based on the transfer rate changed in the processing in S6 (S7).

Specifically, the host 2 issues a write request and transmits the request to the memory system 3 with the write data. The write data is transferred from the host 2 to the memory system 3 at the frequency f_r1 and in the number of lanes n_r1 corresponding to the Rx transfer rate in the fast mode. The memory system 3 performs an SLC write process corresponding to the fast mode in response to the write request, and writes data in the nonvolatile memory 20.

The host 2 issues a read request and transmits it to the memory system 3. The memory system 3 reads data from the nonvolatile memory 20 in response to a read request. The memory system 3 transmits the read data to the host 2. The read data is transferred from the memory system 3 to the host 2 at the frequency f_t1 and in the number of lanes n_t1 corresponding to the Tx transfer rate in the fast mode.

When the write process and the read process in the processing in S7 are finished, the host 2 determines that the state of the memory system 3 is returned to the normal mode. Along with this, the host 2 selects the parameter B corresponding to the normal mode based on the transfer rate information 16 received in the processing in S2. Then, the host 2 and the memory system 3 perform the transfer rate change processing (S8). Thus, the parameter corresponding to the rate of the data transfer between the host 2 and the memory system 3 is changed from the parameter A to the parameter B.

Subsequently, the host 2 and the memory system 3 perform mode change processing (S9). The state of the memory system 3 is thereby changed from the fast mode to the normal mode.

Thereafter, the host 2 and the memory system 3 perform a write process and a read process based on the transfer rate changed in the processing in S9 (S10). The write process and the read process in S10 are the same as those in S4.

As described above, selecting a suitable transfer rate in accordance with the state of the memory system 3, the host 2 and the memory system 3 perform a series of processing.

1.2.3 Transfer Rate Change Processing

FIG. 8 is a sequence diagram showing an example of transfer rate change processing in the information processing system according to the embodiment. FIG. 8 corresponds to details of the processing in S3, S6, and S8 in FIG. 7. FIG. 8 shows details of communications between the control circuit 5, the protocol control unit 52, and the signal processing unit 51 in the host 2, and the control circuit 11, the protocol control unit 42, and the signal processing unit 41 in the memory controller 10 in the transfer rate change processing.

First, the control circuit 5 of the host 2 issues a change request of a transfer rate, and transmits it to the protocol control unit 52 through the data transmission/reception unit 53 (S11). The transfer rate change request includes information relating to a frequency and the number of lanes corresponding to a desired transfer rate, for example.

Upon receipt of the transfer rate change request, the protocol control unit 52 instructs the signal processing unit 51 to query the memory controller 10 about whether or not the transfer rate can be changed (S12). Specifically, the protocol control unit 52, for example, generates an inquiry packet for inquiring whether or not the transfer rate can be changed and transfers it to the signal processing unit 51.

Upon receipt of an inquiry packet generated in the processing in S12, the signal processing unit 51 generates an inquiry signal based on the inquiry packet and transmits it to the signal processing unit 41 of the memory controller 10 (S13).

Upon receipt of the inquiry signal generated in the processing in S13, the signal processing unit 41 detects the inquiry packet in the inquiry signal, and transmits it to the protocol control unit 42 (S14).

Upon receipt of the inquiry packet detected in the processing S14, the protocol control unit 42 checks whether or not the transfer rate can be changed (S15). Specifically, the protocol control unit 42 checks whether or not the memory controller 10 is compatible with the frequency and the number of lanes corresponding to the transfer rate desired by the host 2.

The protocol control unit 42 instructs the signal processing unit 41 to respond to the request from the host 2 (S16). Specifically, for example, the protocol control unit 42 generates a response packet including a check result in the processing in S15 and transmits it to the signal processing unit 41.

Upon receipt of a response packet generated in the processing in S16, the signal processing unit 41 generates a response signal based on the response packet and transmits it to the signal processing unit 51 of the memory controller 2 (S17).

Upon receipt of the response signal generated in the processing in S17, the signal processing unit 51 detects the response packet in the response signal, and transmits it to the protocol control unit 52 (S18).

Upon receipt of the response packet detected in the processing in S18, the protocol control unit 52 checks whether or not the transfer rate can be changed (S19). Specifically, the protocol control unit 52 ascertains whether or not the memory controller 10 is compatible with the frequency and the number of lanes corresponding to the transfer rate desired by the host 2, based on the response packet.

If the memory controller 10 is compatible with the frequency and the number of lanes correspond to the transfer rate desired by the host 2, the protocol control unit 52 instructs the signal processing unit 51 to stop transferring data to the memory controller 10 at the current transfer rate and to start changing the transfer rate (S20). The protocol control unit 52 generates a transfer stop packet instructing termination of data transfer from the memory controller 10 to the host 2 at the current transfer rate, and transmits the packet to the signal processing unit 51.

Upon receipt of the transfer stop packet generated in the processing in S20, the signal processing unit 51 generates a transfer stop signal based on the transfer stop packet and transmits it to the signal processing unit 41 of the memory controller 10 (S21).

Upon receipt of the transfer stop instruction and the setting change instruction generated in the processing in S20, the signal processing unit 51 stops data transfer to the memory controller 10 and changes the setting of the transfer rate (S22). The setting of the transfer rate in the signal processing unit 51 is thus changed.

Upon receipt of the transfer stop signal generated in the processing in S21, the signal processing unit 41 detects the transfer stop packet in the transfer stop signal, and transmits it to the protocol control unit 42 (S23).

Upon receipt of the transfer stop packet detected in the processing in S23, the protocol control unit 42 instructs the signal processing unit 41 to stop transferring data to the host 2 at the current transfer rate and to start changing the transfer rate (S24). The protocol control unit 42 may set the transfer rate for which it was checked whether or not changes can be made in the processing in S15 as a new transfer set.

Upon receipt of the transfer stop instruction and the setting change instruction generated in the processing in S24, the signal processing unit 41 stops data transfer to the host 2 and changes the setting of the transfer rate (S25). The setting of the transfer rate in the signal processing unit 41 is thus changed.

After the processing in S25, the signal processing unit 41 notifies the protocol control unit 42 of the completion of the change of the transfer rate setting (S26).

The protocol control unit 42 transfers the notification received from the signal processing unit 41 in the processing in S26 to the control circuit 11 (S27).

Similarly, after the processing in S22, the signal processing unit 51 notifies the protocol control unit 52 of the completion of the change of the transfer rate setting (S28).

The protocol control unit 52 transfers the notification received from the signal processing unit 51 in the processing in S28 to the control circuit 5 (S29).

After the processing in S27 and S29, the transfer rate change processing is finished.

1.3. Advantageous Effects of Embodiment

According to the embodiment, the memory controller 10 is configured to transmit transfer rate information 16 containing information relating to a transfer rate of write data to the host 2 in response to a transfer rate information read request from the host 2. The transfer rate information 16 includes a frequency $f\_r1$ and the number of lanes $n\_r1$ associated with a fast mode of the memory system 3 and a frequency $f\_r2$ and the number of lanes $n\_r2$ associated with a normal mode. It is thereby possible for the host 2 to discriminate between an optimal transfer rate for operating the memory system 3 in a fast mode and an optimal transfer rate for operating the memory system 3 in a normal mode.

To add an explanation, the write performance of the memory system 3 is rate-determined to time tProg required for a write process. In other words, if the transfer rate is sufficiently higher than a rate of a write process, the transfer rate does not contribute to the write performance. For this reason, an excessive fast transfer rate is unfavorable, as it does not only contribute to the improvement of the write performance but also causes an increase of the power consumption.

According to the embodiment, the host 2 can change a transfer rate in accordance with the state of the memory system 3. Specifically, if the memory system 3 is operated in a normal mode, the host 2 applies a transfer rate lower than a transfer rate applied in the fast mode. It is thus possible to maintain a maximum write performance in accordance with the state of the memory system 3 and to reduce the power consumption at the same time.

2. Modifications

The foregoing embodiment can be variously modified.

2.1. Modifications

In the foregoing embodiment, the number of lanes and a frequency as parameters relating to an optimal transfer rate are associated with the state of the memory system 3 when the parameters are stored in the transfer rate information 16. For example, the parameters relating to an optimal transfer rate may be associated with the number of bits to be written per memory cell by a write process when the parameters are stored.

FIG. 9 is a diagram showing an example of a data structure of transfer rate information stored in a memory system according to a modification.

As shown in FIG. 9, the frequency f_r1 and the number of lanes n_r1 corresponding to the Rx transfer rate in the fast mode and the frequency f_t1 and the number of lanes n_t1 corresponding to the Tx transfer rate in the fast mode are the same as the transfer rate information 16 shown in FIG. 3 in the embodiment. In other words, the parameter A includes the frequency f_r1 and the number of lanes n_r1 corresponding to an Rx transfer rate in a fast mode, and the frequency f_t1 and the number of lanes n_t1 corresponding to a Tx transfer rate in a fast mode. The parameter A corresponds to an SLC write process.

In the transfer rate information 16A, the parameters corresponding to an Rx transfer rate in the normal mode are further classified into two types of parameters, parameter B and parameter C. Each of the parameters B and C is associated with a TLC write process and a QLC (quadruple level cell) write process, respectively. The QLC write process is a write process in which 4-bit data is stored in a single memory cell transistor MT. In other words, if data of the same size is written in the nonvolatile memory 20, a time required for a QLC write process (tProg(QLC)) is longer than a time required for a TLC write process (tProg(TLC)).

The parameter B includes a frequency f_r2_1 and the number of lanes n_r2_1 corresponding to an Rx transfer rate in a normal mode in the case where a TLC write process is performed. The parameter C includes a frequency f_r2_2 and the number of lanes n_r2_2 corresponding to an Rx transfer rate in a normal mode in the case where a QLC write process is performed. The frequency f_t2 and the number of lanes n_t2 corresponding to a Tx transfer rate in the normal mode are included in the parameters B and C in common.

The Rx transfer rate in the fast mode is set to be higher than the Rx transfer rate in the normal mode. In other words, the Rx transfer rate determined by the frequency f_r1 and the number of lanes n_r1 is higher than the Rx transfer rate determined by the frequency f_r2_1 and the number of lanes n_r2_1 and the Rx transfer rate determined by the frequency f_r2_2 and the number of lanes n_r2_2. The Rx transfer rate in a normal mode when a TLC write process is performed is set to be higher than the Rx transfer rate in a normal mode when a QLC write process is performed.

The transmission of the transfer rate information 16A from the memory system 3 to the host 2 in the above-described manner allows the host 2 to ascertain a transfer rate optimal for the number of bits to be written per memory cell by a write process. Thus, when the state of the memory system 3 is in a normal mode, the host 2 can transfer data at different transfer rates between the case where the host 2 causes the memory system 3 to perform a TLC write process and the case where the host 2 causes the memory system 3 to perform a QLC write process. Since a transfer rate can be selected according to a period of time required for a write process, it is possible to further suppress an increase in the power consumption in the data transfer.

2.2. Others

In the foregoing embodiment, the case where a frequency and the number of lanes are stored as the transfer rate information 16 was described; however, the embodiment is not limited to this example. For example, information indicating a mode defining a transfer mode may be written in the transfer rate information 16.

Specifically, if the memory system 3 is a UFS, for example, "HS-G5B 2Lane" and "HS-G4B 1Lane" may be written as the parameters A and B in the transfer rate information 16.

The memory system 3 is a UFS in the foregoing embodiment; however, the embodiment is not limited to this example. For example, the memory system 3 may be a memory card such as an SD™ card, or a solid state drive (SSD). In this case, communication between the device interface circuit 6 and the host interface circuit 13 may be adhered to PCIe™ (peripheral component interconnect express).

In the foregoing embodiment, it is assumed that two lanes of a communication path, a communication path LA1 and a communication path LA2, are provided as a physical communication path for receiving data by the memory controller 10 by the host 2, and two lanes of a communication path, a communication path LB1 and a communication path LB2, are provided as a physical communication path for transmitting data from the memory controller 10 to the host 2; however, the embodiment is not limited to this example. For example, three or more lanes may be provided for a communication path for receiving data by the memory controller 10 from the host 2 and a communication path for transmitting data from the memory controller 10 to the host 2, respectively.

While certain embodiments have been described, these embodiments have been presented by way of example only, and are not intended to limit the scope of the invention. Indeed, the embodiments described herein may be embodied in a variety of other forms; furthermore, various omissions, substitutions and changes in the form of the embodiments described herein may be made without departing from the spirit of the inventions. The embodiments and modifications are included in the scope and spirit of the invention and are included in the scope of the claimed inventions and their equivalents.

What is claimed is:

1. A memory system comprising:

a nonvolatile memory including a plurality of memory cells; and a memory controller having a first state in which write data transferred from an external host is written in the nonvolatile memory at a rate of a first number of bits per memory cell, and a second state in which the write data is written at a rate of a second number of bits per memory cell, the second number of bits larger than the first number of bits, wherein the memory controller is configured to transmit information relating to a transfer rate of the write data to the host in response to a first request from the host, the information includes:

first information associated with the first state; and second information associated with the second state, the memory controller is configured to:

receive, in the first state, the write data from the host at a first transfer rate; and receive, in the second state, the write data from the host at a second transfer rate that is lower than the first transfer rate and lower than a written speed in the second state, the first information includes a first number of lanes and a first frequency, the second information includes a second number of lanes and a second frequency, in a case where the first number of lanes and the second number of lanes are equal, the first frequency is higher than the second frequency, and in a case where the first frequency and the second frequency are equal, the first number of lanes is greater than the second number of lanes.

2. The memory system according to claim 1, wherein the memory controller is configured to:

transmit, in the first state, data to the host at a third transfer rate that is independent from the first transfer rate; and transmit, in the second state, data to the host at a fourth transfer rate that is independent from the second transfer rate.

3. The memory system according to claim 1, wherein the first number of bits is smaller than the second number of bits, and the memory controller in the first state is configured to:

perform, in response to a write request from the host, a first write process in which the write data is written in the nonvolatile memory at a rate of the first number of bits per memory cell;

notify the host of a write process completion after the first write process is completed; and read the write data from the nonvolatile memory after the notification, and perform a second write process in which the write data is written in the nonvolatile memory at a rate of the second number of bits per memory cell.

4. The memory system according to claim 3, wherein the memory controller in the first state is configured to perform the second write process without a request from the host.

5. The memory system according to claim 3, wherein a period of time during which the write data is written in the nonvolatile memory by the first write process is shorter than a period of time during which the write data is written in the nonvolatile memory by the second write process.

6. The memory system according to claim 1, wherein the first number of bits is 1, the second number of bits is equal to or larger than 3, the memory system is adhered to a UFS standard, the first state is a state in which a write booster function is enabled, and the second state is a state in which the write booster function is disable.

7. The memory system according to claim 1, wherein the memory controller further has a third state in which the write data is written in the nonvolatile memory at a rate of a third number of bits per memory cell, the information further includes third information associated with the third state, and the third number of bits differs from the first number of bits and the second number of bits.

8. An information processing system comprising:

a host; and a memory system, wherein the memory system includes:

a nonvolatile memory including a plurality of memory cells;

a memory controller having a first state in which write data transferred from the host is written in the nonvolatile memory at a rate of a first number of bits per memory cell, and a second state in which the write data is written at a rate of a second number of bits per memory cell, the second number of bits larger than the first number of bits, wherein the memory controller is configured to transmit information relating to a transfer rate of the write data to the host in response to a first request from the host, the information includes:

first information associated with the first state; and second information associated with the second state, and the host is configured to:

transmit, in a case where the memory controller is operated in the first state, the write data to the memory controller at a first transfer rate, based on the first information; and transmit, in a case where the memory controller is operated in the second state, the write data to the memory controller at a second transfer rate that is lower than the first transfer rate and lower than a written speed in the second state, based on the second information, the first information includes a first number of lanes and a first frequency, the second information includes a second number of lanes and a second frequency, in a case where the first number of lanes and the second number of lanes are equal, the first frequency is higher than the second frequency, and in a case where the first frequency and the second frequency are equal, the first number of lanes is greater than the second number of lanes.

9. The information processing system according to claim 8, wherein the first number of bits is smaller than the second number of bits, and the memory controller in the first state is configured to:

perform, in response to a write request from the host, a first write process in which the write data is written in the nonvolatile memory at a rate of the first number of bits per memory cell;

notify the host of a write process completion after the first write process is completed; and read the write data from the nonvolatile memory after the notification, and perform a second write process in which the write data is written in the nonvolatile memory at a rate of the second number of bits per memory cell.

10. The information processing system according to claim 9, wherein the memory controller in the first state is configured to perform the second write process without a request from the host.

11. The information processing system according to claim 9, wherein a period of time during which the write data is written in the nonvolatile memory by the first write process is shorter than a time during which the write data is written in the nonvolatile memory by the second write process.

12. The information processing system according to claim 8, wherein the first number of bits is 1, the second number of bits is equal to or larger than 3, the memory system is adhered to a UFS standard, the first state is a state in which a write booster function is enabled, and the second state is a state in which the write booster function is disable.

13. The memory system according to claim 1, wherein the memory controller is configured to:

transmit information to the host, the information indicating whether or not the memory controller is compatible with a desired transfer rate desired by the host;

receive an instruction from the host to stop transferring data at a current transfer rate; and in response to the instruction, stop transferring data at the current transfer rate and change from the current transfer rate to the desired transfer rate.

14. The information processing system according to claim 8, wherein the host is configured to:

ascertain whether or not the memory controller is compatible with a desired transfer rate desired by the host based on information from the memory controller; and stop, in a case where the memory controller is compatible with the desired transfer rate, transferring data at a current transfer rate and change from the current transfer rate to the desired transfer rate.

\* \* \* \* \*